US012706244B2

(12) United States Patent
Bustreo et al.

(10) Patent No.: US 12,706,244 B2
(45) Date of Patent: Aug. 11, 2026

(54) METHOD AND CONDUCTOR STRUCTURE FOR MANUFACTURING AN ELECTRIC WINDING OF AN ELECTROMAGNETIC INDUCTION APPARATUS

(71) Applicant: HITACHI ENERGY LTD, Zürich (CH)

(72) Inventors: Gianluca Bustreo, Mirano (IT); Paolo Pavanello, Granze (IT); Massimo Carmignoto, Montegrotto Terme (IT)

(73) Assignee: HITACHI ENERGY LTD, Zürich (CH)

( * ) Notice: Subject to any disclaimer, the term of this patent is extended or adjusted under 35 U.S.C. 154(b) by 1232 days.

(21) Appl. No.: 17/631,458

(22) PCT Filed: Jan. 26, 2021

(86) PCT No.: PCT/EP2021/051735
§ 371 (c)(1),
(2) Date: Jan. 29, 2022

(87) PCT Pub. No.: WO2021/151878
PCT Pub. Date: Aug. 5, 2021

(65) Prior Publication Data
US 2022/0277895 A1 Sep. 1, 2022

(30) Foreign Application Priority Data
Jan. 30, 2020 (EP) .................................... 20154657

(51) Int. Cl.
*H01F 27/32* (2006.01)
*H01F 41/06* (2016.01)
*H01F 41/12* (2006.01)

(52) U.S. Cl.
CPC ............ *H01F 41/06* (2013.01); *H01F 27/32* (2013.01); *H01F 41/12* (2013.01)

(58) Field of Classification Search
CPC ....................................................... H01F 27/32
(Continued)

(56) References Cited

U.S. PATENT DOCUMENTS 2,310,684 A * 2/1943 Farry .................. H01F 27/2871 29/605
6,051,793 A 4/2000 Byrne et al.
2009/0078448 A1* 3/2009 Tillner .................... H02K 3/24 174/133 R

FOREIGN PATENT DOCUMENTS

DE 2657607 A1 6/1978
JP 2002110434 A 1/2011
(Continued)

OTHER PUBLICATIONS

English translation of JP2008228551 (Year: 2008).*
(Continued)

*Primary Examiner* — Ronald Hinson
(74) *Attorney, Agent, or Firm* — Sage Patent Group

(57) ABSTRACT

A method for manufacturing an electric winding of an electromagnetic induction apparatus includes providing a conductor structure including a conductor element extending longitudinally along a main extension direction and one or more spacer tapes of electrically insulating material around said conductor element along said main extension direction, each spacer tape having spacer portions at corresponding lateral surfaces of said conductor element and spaced one from another along the lateral surfaces. The method includes forming an electric winding extending axially along a winding direction and having a plurality of turns arranged around said winding direction where each turn is formed by a corresponding longitudinal portion of said conductor element. The spacer portions are interposed between adjacent turns at opposite sides and respectively positioned spaced one from another to define an empty space
(Continued)

to form a radial channel of the electric winding and configured for a passage of an electrically insulating medium.

16 Claims, 5 Drawing Sheets

(58) Field of Classification Search
USPC .......................................................... 336/223
See application file for complete search history.

(56) References Cited

FOREIGN PATENT DOCUMENTS

| | | | |
|---|---|---|---|
| KR | 20090031838 | A | 11/2015 |
| WO | WO 2019/219226 | A1 | 11/2019 |

OTHER PUBLICATIONS

International Search Report and Written Opinion of the International Searching Authority, PCT/EP2021/051735, mailed Mar. 4, 2021, 17 pages.
Beckmöller, S., Dr., et al., "Wires and Transposed Cables in Transformers," Essex Germany GmbH, Jun. 6, 2013 (XP055421454), 39 pages.
First Office Action, Chinese Invention Patent Application No. 2021800048066, mailed Mar. 31, 2026, 9 pages.
Decision for Grant of Patent, KR Patent Application No. 10-2022-7001551, mailed Oct. 8, 2024, 6 pages.

* cited by examiner

METHOD AND CONDUCTOR STRUCTURE FOR MANUFACTURING AN ELECTRIC WINDING OF AN ELECTROMAGNETIC INDUCTION APPARATUS

CROSS-REFERENCE TO RELATED APPLICATIONS

This application is a 35 U.S.C. § 371 national stage application of PCT International Application No. PCT/EP2021/061735 filed on Jan. 26, 2021, which claims priority to European Patent No. 20154657 filed on Jan. 30, 2020, the disclosure and content of each which is incorporated by reference herein in its entirety.

DESCRIPTION

The present subject matter relates to the field of electromagnetic induction apparatuses for electric power transmission and distribution grids, for example power transformers.

More particularly, the subject matter relates to a method and a conductor structure for manufacturing an electric winding of an electromagnetic induction apparatus.

BACKGROUND

Electric windings of electromagnetic induction apparatuses may be manufactured at industrial level according to various methods.

A widely used method consists in winding a conductor around a winding direction, so that the electric winding has a plurality of adjacent turns arranged around said winding direction.

As it is known, generally, electric windings for electromagnetic induction apparatuses have axial and radial channels to ensure the passage of an electrically insulating medium (e.g. an insulating fluid or a solid cast resin) among the turns.

Traditionally, the axial channels of an electric winding are obtained by arranging insulating blocks oriented in parallel to the winding direction while electrically insulating spacers interposed between adjacent turns of the electric winding and oriented radially with respect to the winding direction are arranged to define the radial channels.

According to most traditional solutions of the state of the art, the above-mentioned insulating spacers are inserted manually between each pair of adjacent turns, during the winding process.

According to more recent manufacturing methods, insulating spacers are fixed along a suitable lateral surface of a conductor intended to form the turns of the electric winding. The conductor structure so obtained is then wound around a winding direction. In this way, insulating spacers take position between each pair of adjacent turns of said electric winding.

State-of-the-art electric windings for electromagnetic induction apparatuses generally perform their functions in a rather satisfying way. However, there are still some critical aspects to deal with.

In operation, electric windings often show deformed turns, particularly at the regions where radial channels are present. Basically, this phenomenon is due to the fact that, in operation, an electric winding is subject to huge compressive forces along directions substantially parallel to its winding direction.

The above-illustrated technical issue may lead to a dangerous unbalancing condition of the overall winding structure, which may cause its collapse in certain operating conditions, e.g. when short-circuit currents flow along the electric winding and this latter is subject to huge mechanical stresses.

SUMMARY

The main aim of the present subject matter is to provide a method and a conductor structure for manufacturing an electric winding of an electromagnetic induction apparatus, which allows the above-mentioned critical aspects to be overcome or mitigated.

Within this aim, another object of the present subject matter is providing a method and a conductor structure for manufacturing an electric winding, which allow obtaining an electric winding with a high structural balancing and a high resistance to mechanical stresses.

Another object of the present subject matter is providing a method and a conductor structure for manufacturing an electric winding, which are relatively easy and inexpensive to implement at industrial level.

This aim and these objects, together with other objects that will be more apparent from the subsequent description and from the accompanying drawings, are achieved, according to the subject matter, by a method for manufacturing an electric winding of an electromagnetic induction apparatus, according to some embodiments.

In a general definition, the method includes the following steps:

- providing a conductor structure including a conductor element extending longitudinally along a main extension direction and one or more spacer tapes of electrically insulating material around said conductor element along said main extension direction. Each spacer tape has spacer portions at corresponding opposite lateral surfaces of said conductor element. Said spacer portions are spaced one from another along the lateral surfaces of said conductor element;
- forming an electric winding by means of said conductor structure. Said electric winding extends axially along a winding direction and it has a plurality of turns arranged around said winding direction.

According to an embodiment, the spacer tape is to be understood in that the spacer tape spaces apart the turns of the winding and is not just an insulation- or separation-tape, which could be executed very thin. Hence, the spacer tape can have a thickness along the radial direction of the conductor element in between 0.5 mm and 10 mm. The thickness of 0.5 mm or greater avoids a hindrance of the flow of a coolant, as an insulating fluid. A thickness of 10 mm or less avoids stability issues of the winding. Thus, according to the embodiment, the thickness between 0.5 mm and 10 mm enables a reliable flow of the coolant and a reliable stability of the winding. By defining that the radial channels are meant for an electrically insulating medium, the isolating tape can be omitted completely. As a consequence, the manufacturing of the winding is less laborious and faster. Moreover, as the insulating medium has direct contact to the conductor the cooling of the winding is more efficient. According to embodiments, the radial channels are meant for an electrically insulating medium. Thus, for example, an additional isolating tape can be omitted completely. Thus, the manufacturing of the winding is less laborious and faster. Moreover, as the insulating medium has direct contact to the conductor, the cooling of the winding is more efficient.

According to the invention, each turn of said electric winding is formed by a corresponding longitudinal portion of said conductor element.

According to the subject matter, spacer portions of each spacer tape are interposed between adjacent turns of said electric winding at opposite sides of said turns.

According to some embodiments, said conductor structure comprises a single spacer tape wound around said conductor element.

According to other embodiments, said conductor structure comprises a plurality of spacer tapes.

According to some embodiments, the one or more spacer tapes of said conductor structure are wound around said conductor element along the entire length of said conductor element.

According to other embodiments, when the conductor structure comprises multiple spacer tapes wound around said conductor element, each spacer tape is wound around a corresponding longitudinal portion of said conductor element. Said longitudinal portion is intended to form a turn of said electric winding.

Preferably, the spacer portions of each spacer tape are oriented along first and second fixing directions transversal to the main extension direction of said conductor element.

Preferably, the one or more spacer tapes of said conductor structure are fixed to said conductor element by gluing or by means of an electrically insulating enclosure element wound around said conductor element.

Preferably, said conductor element is a continuously transposed conductor.

In a further aspect, the present subject matter relates to a conductor structure for manufacturing an electric winding of an electromagnetic induction apparatus according to some embodiments.

The conductor structure, according some aspects, comprises a conductor element extending longitudinally along a main extension direction and one or more spacer tapes of electrically insulating material around said conductor element along said main extension direction.

Each spacer tape has spacer portions at corresponding lateral surfaces of said conductor element, said spacer portions being spaced one from another along the lateral surfaces of said conductor element.

According to some embodiments, the conductor structure is intended to form an electric winding, which extends axially along a winding direction and which has a plurality of turns arranged around said winding direction.

Each turn of said electric winding is formed by a corresponding longitudinal portion of said conductor element.

Spacer portions of each spacer tape are interposed between adjacent turns of said electric winding at opposite sides of said turns.

In yet a further aspect, the present disclosure relates to an electric winding for an electromagnetic induction apparatus, according to some embodiments.

In yet a further aspect, the present subject matter relates to an electromagnetic induction apparatus for electric power transmission and distribution grids according to some embodiments.

Preferably, said electromagnetic induction apparatus is an electric transformer for electric power transmission and distribution grids.

BRIEF DESCRIPTION OF THE DRAWINGS

Further characteristics and advantages of the present invention will be more apparent with reference to the description given below and to the accompanying figures, provided purely for explanatory and non-limiting purposes, wherein.

DESCRIPTION

With reference to the aforesaid figures, the present disclosure relates to method for manufacturing an electric winding 100 of an electromagnetic induction apparatus (not shown) for electric power transmission and distribution grids.

Such an electromagnetic induction apparatus may be an electric transformer for electric power transmission and distribution grids, for example a power transformer or a distribution transformer.

Figure 3:
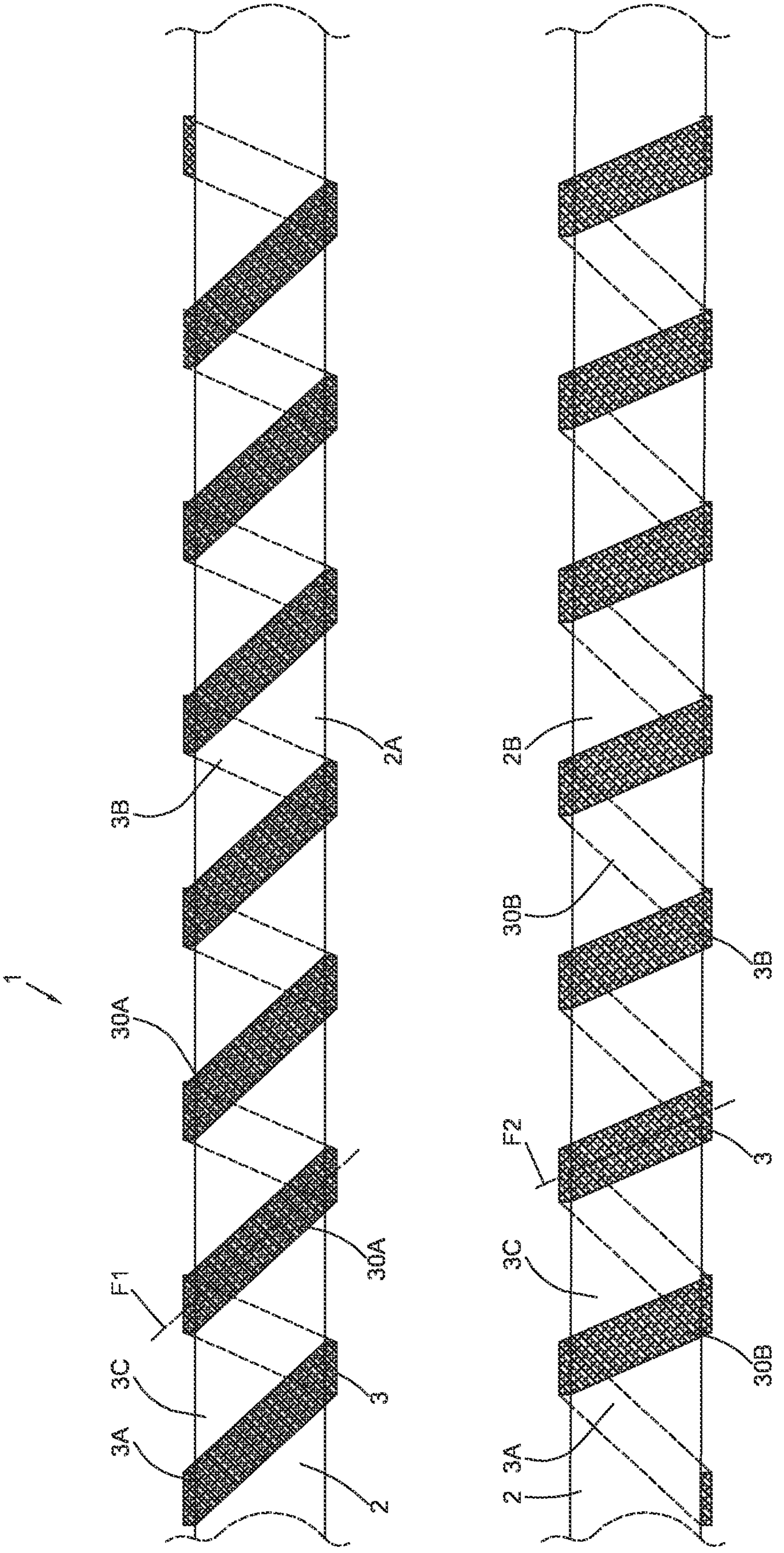
FIGS. 3-4 schematically illustrate portions of a conductor structure, according to various embodiments.
Figure 4:
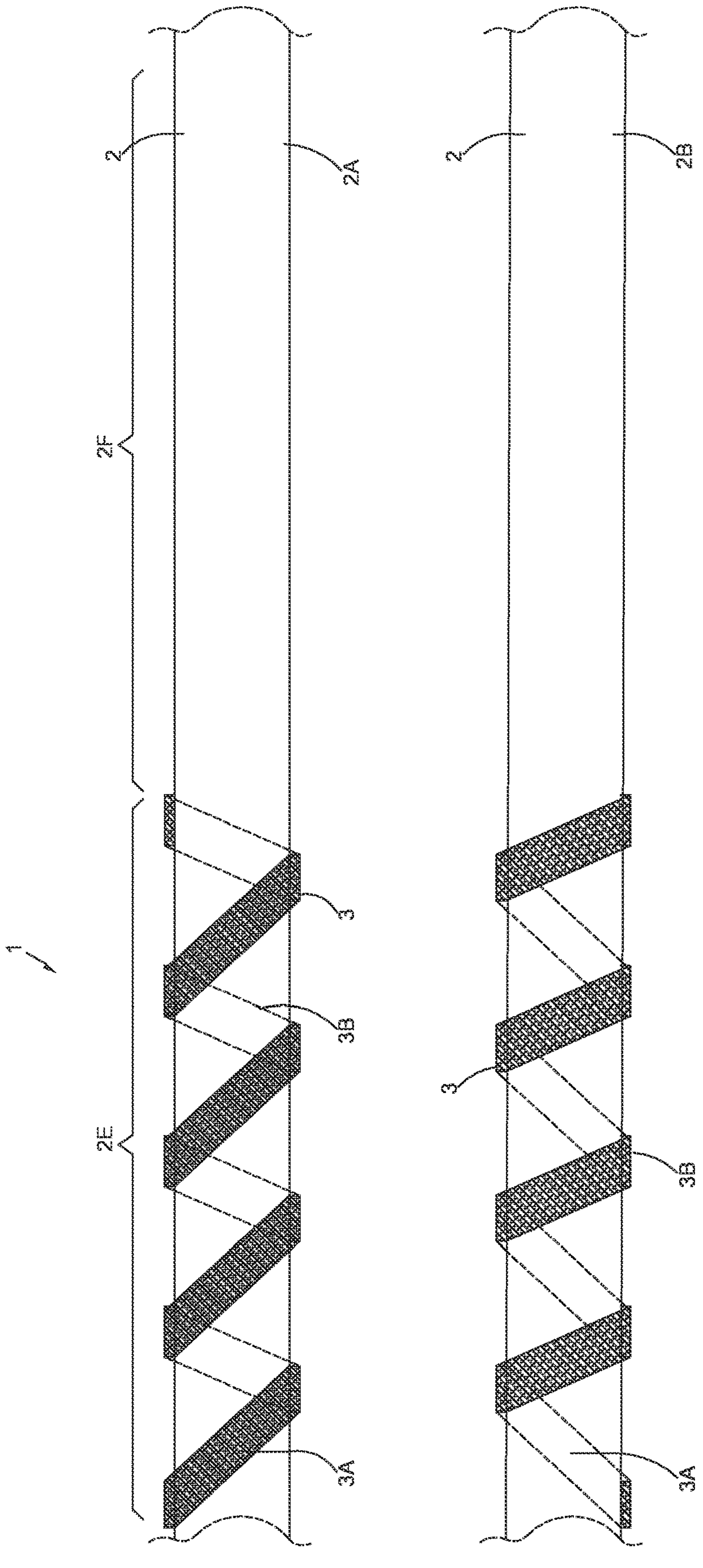

The manufacturing method, according to the subject matter, comprises a step of providing a conductor structure 1 intended to form the electric winding 100 (FIGS. 3, 4).

Figure 1:
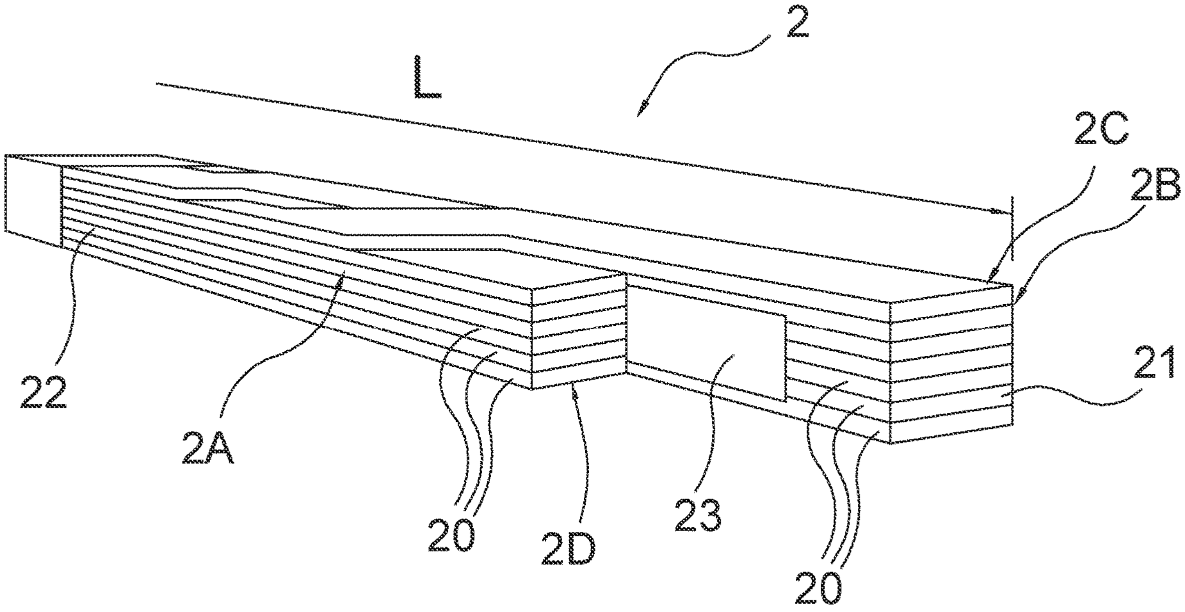
FIG. 1 schematically shows a conductor element used in the manufacturing method and conductor structure, according to the present subject matter.

The conductor structure 1 comprises a conductor element 2 extending longitudinally along a main extension direction L (FIG. 1).

Preferably, the conductor element 2 is shaped as an elongated parallelepiped including conductive material.

Preferably, the conductor element 2 has a shaped section (e.g. a rectangular or square cross section) opposite first and second lateral surfaces 2A, 2B and opposite third and fourth lateral surfaces 2C, 2D.

According to some embodiments, the conductor element 2 is a continuously transposed conductor.

In this case, the conductor element 2 may be manufactured according to the construction shown in FIG. 1.

According to this embodiment, the conductor element 2 comprises two or more stacks 21, 22 of conductors, which are placed side by side along the extension direction L of said conductor element.

Stacked conductors 20 have portions alternating between the above-mentioned stacks 21, 22. In this way, portions of stacked conductors 20 alternately occupy every possible cross section position along the whole longitudinal extension of the conductor element 2.

Stacked conductors 20 may be at least partially covered by electrically insulating material.

The conductor element 2 may include an insulating separator 23 arranged between the stacks 21, 22 of conductors along the extension direction L of said conductor.

The conductor element 2 may include an insulating band or mesh (not shown) wound around the stacked conductors 20 to maintain these latter in position during the winding operations.

According to other embodiments of the invention, however, the conductor element 2 may have different constructions (which may be of known type).

For example, it may include a single conductor, a plurality of conductors arranged side by side or a bundle of twisted conductors.

As a further example, the conductor element 2 may be formed by one or more conductive bars or by one or more conductive foils or disks.

According to some embodiments (not shown), the conductor structure 1 include one or more layers of electrically insulating material arranged in such a way to externally cover the conductors of said conductor element.

Such an electrically insulating material may be arranged according to solutions of known type. For example, it may be selected in a group of materials comprising: paper, polyester materials, aramid or stabilized-PE materials, fiberglass materials, and the like.

The conductor structure 1 comprises one or more spacer tapes 3 of electrically insulating material around the conductor element 2 along the main extension direction L of this latter.

Each spacer tape 3 may be directly fixed to the conductors of the conductor element 2, or on an insulating layer of said conductor element or on an additional insulating band or mesh surrounding said conductor element.

Preferably, the electrically insulating material of each spacer tape 3 is selected in a group of materials comprising: pressed paperboard, plastic materials, fiberglass materials, nylon-based materials.

Each spacer tape 3 has a plurality of spacer portions 3A, 3B at corresponding lateral surfaces 2A, 2B of the conductor element 2.

Preferably, the spacer portions 3A, 3B of each spacer tape 3 have an elongated shape and they are arranged on the lateral surfaces 2A, 2B of the conductor element 2 transversally with respect to the main extension direction L of said conductor element.

The spacer portions 3A, 3B are arranged spaced one from another to delimit suitable empty regions 3C along the one or more lateral surfaces 2A, 2B of the conductor element 2.

According to an embodiment, a spacer tape 3 thickness in between 0.5 mm and 10 mm is very suitable to form empty spaces 3C which are appropriate to form radial channel 104 for a coolant, in particular for an electrically insulating medium.

According to some embodiments, each spacer tape 3 is fixed to the conductor element 2 by gluing.

Glue may be applied to each spacer tape 3 and/or to the corresponding fixing surfaces 2A, 2B of the conductor element 2 in a known manner, for example by spraying, brushing, dusting, by immersion or by applying a prepreg film activatable by UV radiation or heat.

Special glues designed to withstand high temperatures (e.g. up to 250° C.) may be used. This solution is particularly advantageous when the insulating medium of the electromagnetic induction apparatus is made of epoxy resin or similar materials.

The above-describe solutions are quite advantageous. Gluing the one or more spacer tapes 3 wound around the conductor element 2 allows preventing or reducing possible undesired dislocations of the spacer portions 3A, 3B. Such dislocations of spacer portions 3A, 3B may occur due tangential forces exerted on the winding turns during the operation of the electromagnetic induction apparatus (this phenomenon is also referred to as “spiraling” of the electric winding) or during manufacturing.

According to other embodiments, each spacer tape 3 is fixed to the conductor element 2 by means of an additional electrically insulating enclosure (e.g. formed by an electrically insulating band or mesh wound around the assembly formed by the conductor element 2 and the one or more spacer tapes 3), for example made of a glass-fiber material or polyester.

Also in this case, the spacer tapes 3 may be directly fixed on the conductors 20 of the electrical conductor element 2, or on an insulating layer of said conductor or on an insulating tape or mesh surrounding said conductor.

According to the method of the subject matter, once the conductor structure 1 is obtained, it is carried out a step of forming the electric winding 100 by means of the conductor structure 1 described above.

Figure 2:
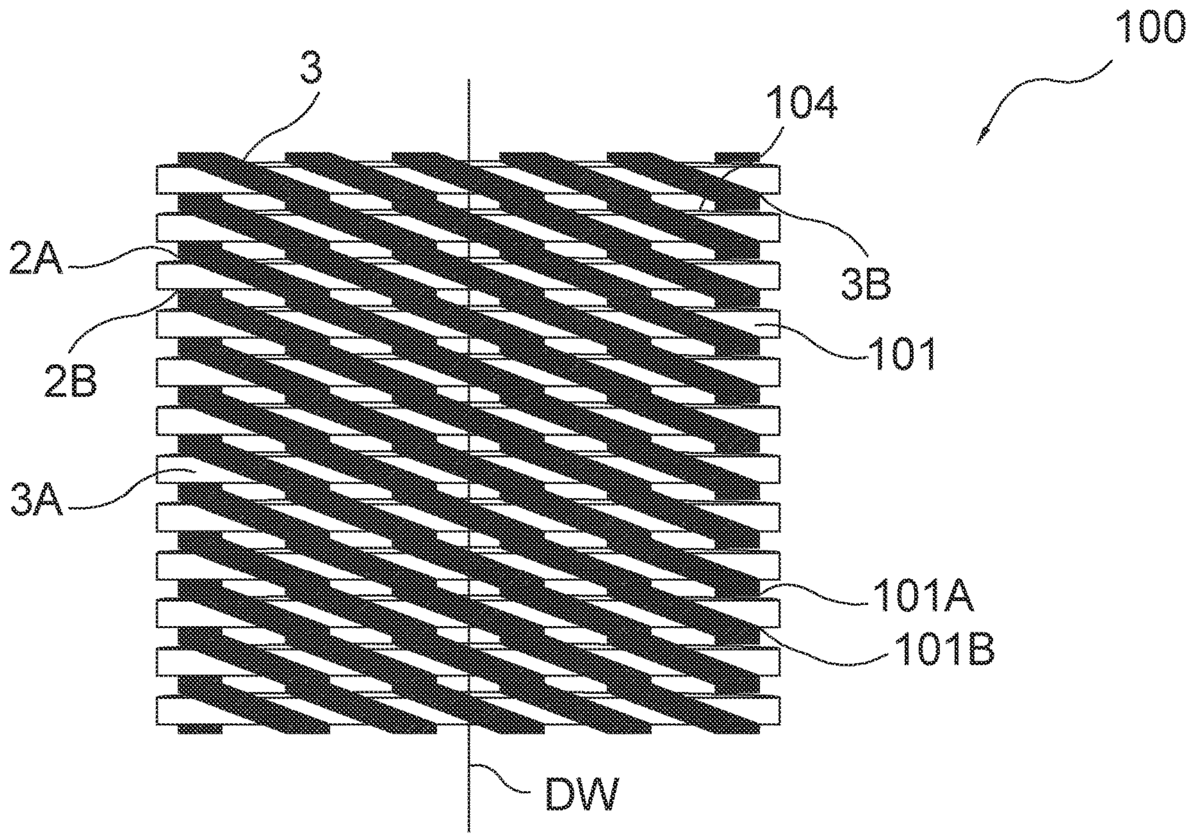
FIG. 2 schematically shows an electric winding for an electromagnetic induction apparatus obtained by means of the manufacturing method, according to the present subject matter.

The electric winding 100 extends axially along the winding direction DW (FIG. 2).

Preferably, e.g. when the conductor structure can be bent by means of a suitable bending apparatus, the step of forming the electric winding 100 includes winding the conductor structure 1 around the winding direction DW.

According to alternative embodiments, e.g. when the conductor structure cannot be bent, the step of forming the electric winding 100 may include the step of mechanically connecting separated portions of the conductor structure 1 to form the electric winding 100.

The electric winding 100 has a plurality of adjacent turns 101 arranged around the winding direction DW (FIG. 2).

Each turn 101 is formed by a corresponding longitudinal portion of the conductor element 2 included in the winding structure 1.

Figure 2A:
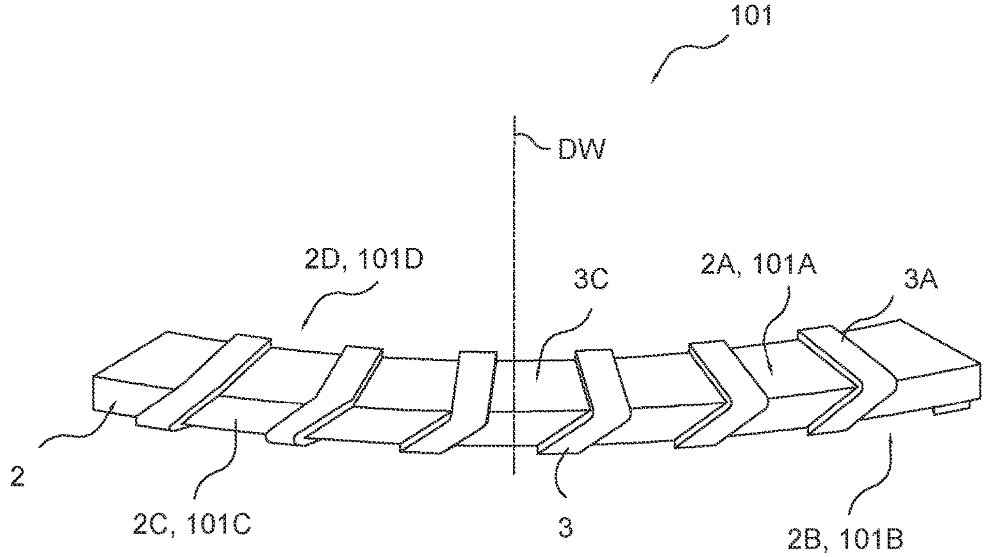
FIGS. 2A, 2B schematically show opposite views of a turn portion of the electric winding of FIG. 2 manufactured according to an embodiment of the manufacturing method.
Figure 2B:
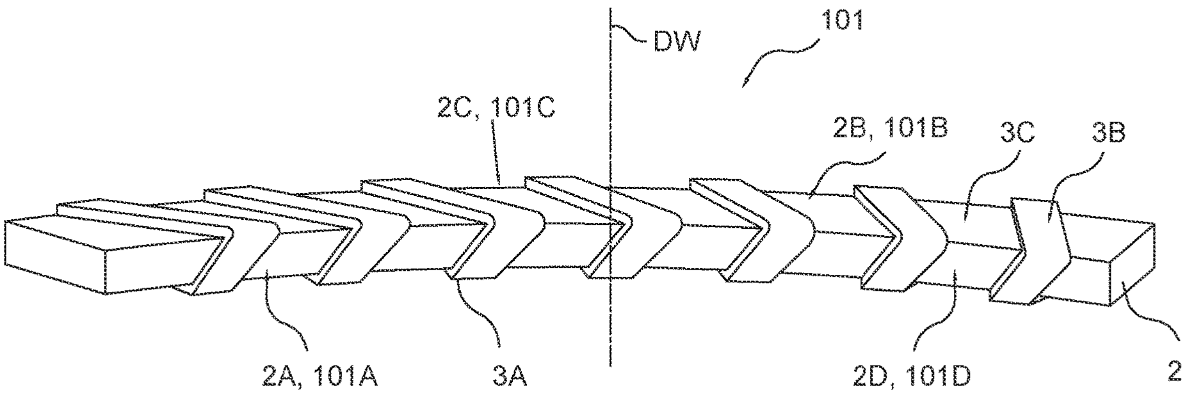

In the electric winding 100, the first and second lateral surfaces 2A, 2B of the conductor element 2 are positioned perpendicular to the winding direction DW and form first and second sides 101A, 101B of each turn 101, which extend radially with respect to said winding direction, while the third and fourth lateral surfaces 2C, 2D of the conductor element 2 are positioned parallel to the winding direction DW and form third and fourth sides 101C, 101D of each turn 101, which extend parallel and coaxially to said winding direction (FIGS. 2A, 2B).

In the electric winding 1, the spacer portions 3A, 3B of each spacer tape 3 are interposed between adjacent turns 101 at the first and second sides 101A, 101B of these latter. In this way, the spacer portions 3A, 3B extend along radial planes perpendicular to said winding direction DW (FIG. 2).

The empty regions 3C delimited by the spacer portions 3A, 3B form radial channels 104 of the electric winding 100, which ensure the passage of an electrically insulating medium (e.g. insulating fluid or solid cast resin) among adjacent turns 101. According to an embodiment, a thickness in between 0.5 mm and 10 mm for the spacer tape 3 is a fitting dimension to form empty spaces 3C which are appropriate to form radial channels 104, which can be used for a coolant to flow through.

An important aspect consists in that, in the electric winding 100, each spacer portion 3A, 3B at one side 101A, 101B of a turn 101 of the electric winding is partially overlapped with at least two spacer portions 3B, 3A at the opposite side 101B, 101A of said turn (FIGS. 2, 2A, 2B, 3, 4).

In other words, in the electric winding 100, each spacer portion 3A, 3B at a side 101A, 101B of a turn 101 has at least two overlapping portions 30A, 30B, each overlapping with a corresponding overlapping portion 30B, 30A of a spacer portion 3B, 3A at the opposite side 101B, 101A of said turn (FIG. 3).

FIGS. 2A, 2B show opposite views (i.e. related to the opposite sides 101A, 101B) of a portion of a turn 101 of an electric winding 100, manufactured according to an embodiment of the method.

The turn 101 is formed by the conductor element 2, which may be manufactured as described above.

At the first and second sides 101A, 101B of the turn 101 (which are formed by the first and second lateral surfaces 2A, 2B of the conductor element 2, as explained above), the first spacer portions 3A and the second spacer portions 3B of each spacer tape 3 are respectively positioned spaced one from another to define intermediate empty spaces 3C intended to form the radial channels 104 of the electric winding 100. According to an embodiment, a thickness in between 0.5 mm and 10 mm of the spacer band provides a height for the radial channels 104, which assures an optimal flow of a coolant through the winding 1.

Conveniently, the first and second spacer portions 3A, 3B of each tape 3 are respectively oriented according to first and second fixing directions F1, F2 that are transversal to the main extension direction L (longitudinal axis) of the conductor element 2 (FIG. 3).

As it is possible to notice, in all the above-illustrated embodiments, each spacer portion 3A at the first side 101A of the turn 101 is overlapped with two spacer portions 3B at the second side 101B of the turn 101.

In particular, each spacer portion 3A has two overlapping regions 30A overlapped with a corresponding overlapping regions 30B of two spacer portions 3B along suitable overlapping directions parallel to the winding direction DW.

Similarly, each spacer portion 3B at the second side 101B of the turn 101 is overlapped with two spacer portions 3A at the first side 101A of the turn 101.

In particular, each spacer portion 3B has two overlapping regions 30B overlapped with corresponding overlapping regions 30A of two spacer portions 3A along suitable overlapping directions parallel to the winding direction DW.

It has been seen that the solution provided by the claimed subject matter greatly improves the overall resistance of the electric winding 100 to compressive forces as it ensures an optimal structural balancing.

It is therefore possible to prevent or remarkably mitigate the onset of deformation phenomena of the turns of the electric winding 100 during the operation of the electromagnetic induction apparatus.

As it can be understood from the examples of FIGS. 3 and 4, the above-mentioned result is achieved by suitably arranging the one or more spacer tapes 3 in the conductor structure 1.

According to some embodiments, the conductor structure 1 comprises a single spacer tape 3 wound around the conductor element 2.

In this case, as shown in FIG. 3, the spacer tape 3 is conveniently wound around the conductor element 2 along the entire length of this latter.

According to this solution, the spacer portions 3A, 3B of the spacer tape 3, which are arranged between adjacent turns 101 of the electric winding 100, may be overlapped and in contact one with another. This further improves the overall structural sturdiness of the electric winding 100 even if it may cause an increased spacing between each pair of adjacent turns 101.

According to some embodiments, the conductor structure 1 comprises a plurality of spacer tapes 3.

Preferably, each spacer tape 3 is wound around a corresponding longitudinal portion of the conductor element 2, which is intended to form a turn 101 of the electric winding 100.

The spacer tape 3 may be wound around the conductor element 2 along the entire length of this latter, similarly to the solution shown in FIG. 3.

However, according to other embodiments (FIG. 4), the above-mentioned multiple spacer tapes 3 may be wound around the conductor element 2 at selected longitudinal portions 2E of the conductor element 2, along the main extension direction L, which are alternate with longitudinal portions 2F, on which no spacer tape is present. Conveniently, each longitudinal portion 2E, 2F has a length (measured along the main extension direction L) equal to the length of a turn 101 of the electric winding 100.

This solution allows reducing the spacing between each pair of adjacent turns 101 of the electric winding 100.

The method and conductor structure, according to the embodiments, provide relevant advantages.

The method and conductor structure, according to the embodiments, allow obtaining an electric winding with a high structural balancing and a high resistance to mechanical stresses, in particular to compression stresses.

This allows preventing or reducing the deformation of the turns of the electric winding in operation with a consequent remarkable increase of the reliability of the electromagnetic induction apparatus in operation, even in presence of fault events or short-circuit events.

The method and conductor structure, according to the embodiments, are relatively easy to implement at industrial level at competitive costs with respect to known solutions of the state of the art.

The invention claimed is:

1. A conductor structure for manufacturing an electric winding of an electromagnetic induction apparatus, comprising:

a conductor element extending longitudinally along a main extension direction;

one or more spacer tapes of electrically insulating material around said conductor element along said main extension direction, each of the one or more spacer tapes having a plurality of spacer portions at corresponding lateral surfaces of said conductor element, said spacer portions being spaced one from another along the lateral surfaces of said conductor element; and one or more glue layers between the each of the one or more spacer tapes and the conductor element, each of the one or more glue layers fixing the one or more spacer tapes to the conductor element, wherein said conductor structure is intended to form an electric winding, said electric winding extending axially along a winding direction and having a plurality of turns arranged around said winding direction, wherein each turn of said electric winding is formed by a corresponding longitudinal portion of said conductor element, and wherein spacer portions of each of the one or more spacer tapes are interposed between adjacent turns of said electric winding at opposite sides of said turns, wherein the spacer portions are respectively positioned spaced one from another to define an empty space to form a radial channel of the electric winding, wherein the radial channel is configured for a passage of an electrically insulating medium.

2. A conductor structure for manufacturing an electric winding of an electromagnetic induction apparatus according to claim 1, wherein each of the one or more spacer tapes has a thickness between 0.5 mm and 10 mm.

3. An electric winding for an electromagnetic induction apparatus a conductor structure according to claim 1.

4. An electromagnetic induction apparatus for electric power transmission and distribution grids comprising an electric winding according to claim 1.

5. The conductor structure according to claim 1, wherein each of the one or more spacer tapes is wound around a corresponding longitudinal portion of said conductor element, which is intended to form a turn of said electric winding.

6. The conductor structure according to claim 1, wherein the conductor element is a continuously transposed conductor.

7. The conductor structure according to claim 1, wherein the one or more spacer tapes comprises a single spacer tape wound around said conductor element.

8. The conductor structure according to claim 1, wherein the one or more spacer tapes comprises a plurality of spacer tapes.

9. The conductor structure according to claim 1, wherein the spacer portions of each of the one or more spacer tapes are oriented along first and second fixing directions transversal to the main extension direction of said conductor element.

10. The conductor structure according to claim 1, wherein each of the one or more spacer tapes are-is wound around said conductor element along the entire length of said conductor element.

11. The conductor structure according to claim 1, wherein the conductor element is shaped as an elongated parallelepiped.

12. The conductor structure according to claim 1, wherein the one or more glue layers are configured to withstand temperatures up to at least 250° C.

13. The conductor structure according to claim 1, wherein the one or more spacer tapes are arranged such that first overlapping regions of first spacer portions of the plurality of spacer portions overlap with second overlapping regions of second spacer portions of the plurality of spacer portions along overlapping directions parallel to a winding direction of the conductor structure.

14. A conductor structure for manufacturing an electric winding of an electromagnetic induction apparatus, comprising:

a conductor element extending longitudinally along a main extension direction;

one or more spacer tapes of electrically insulating material around said conductor element along said main extension direction, each of the one or more spacer tapes having a plurality of spacer portions at corresponding lateral surfaces of said conductor element, said spacer portions being spaced one from another along the lateral surfaces of said conductor element; and an electrically insulating enclosure surrounding the conductor element and the one or more spacer tapes, the electrically insulating enclosure fixing the one or more spacer tapes to the conductor element, wherein said conductor structure is intended to form an electric winding, said electric winding extending axially along a winding direction and having a plurality of turns arranged around said winding direction, wherein each turn of said electric winding is formed by a corresponding longitudinal portion of said conductor element, and wherein spacer portions of each of the one or more spacer tapes are interposed between adjacent turns of said electric winding at opposite sides of said turns, wherein the spacer portions are respectively positioned spaced one from another to define an empty space to form a radial channel of the electric winding, wherein the radial channel is configured for a passage of an electrically insulating medium.

15. The conductor structure according to claim 14, wherein the electrically insulating enclosure comprises an electrically insulating band wound around the conductor element and the one or more spacer tapes.

16. The conductor structure according to claim 15, wherein the electrically insulating enclosure comprises an electrically insulating mesh surrounding the conductor element and the one or more spacer tapes.

* * * * *